United States Patent
Patanapongpibul et al.

(10) Patent No.: US 8,363,741 B2
(45) Date of Patent: Jan. 29, 2013

(54) DATA TRANSMISSION IN TELECOMMUNICATIONS NETWORKS

(75) Inventors: Leo Patanapongpibul, Newbury (GB); Timothy Frost, Madrid (ES)

(73) Assignee: Vodafone Intellectual Property Licensing Limited, Newbury, Berkshire (GP)

( * ) Notice: Subject to any disclaimer, the term of this patent is extended or adjusted under 35 U.S.C. 154(b) by 533 days.

(21) Appl. No.: 12/658,626

(22) Filed: Feb. 5, 2010

(65) Prior Publication Data

US 2010/0215117 A1      Aug. 26, 2010

(30) Foreign Application Priority Data

Feb. 5, 2009   (GB) .................................. 0901853.2

(51) Int. Cl.
H04L 27/00       (2006.01)
(52) U.S. Cl. ........................................ 375/260; 375/295
(58) Field of Classification Search .................. 375/259, 375/260, 295, 302, 308
See application file for complete search history.

(56) References Cited

U.S. PATENT DOCUMENTS

| | | | | |
|---|---|---|---|---|
| 6,598,200 | B1 * | 7/2003 | Greenwood et al. | 714/774 |
| 7,813,435 | B2 * | 10/2010 | Park et al. | 375/260 |
| 2005/0220172 | A1 * | 10/2005 | Mo et al. | 375/130 |
| 2008/0009294 | A1 * | 1/2008 | Cho et al. | 455/451 |
| 2010/0097955 | A1 * | 4/2010 | Jou | 370/253 |

OTHER PUBLICATIONS

CPRI Specification V4.0 (Jun. 30, 2008), Common Public Radio Interface (CPRI); Interface Specification, 96 pp.

* cited by examiner

*Primary Examiner* — David B Lugo
(74) *Attorney, Agent, or Firm* — Muirhead and Saturnelli, LLC

(57) ABSTRACT

A method of mapping a plurality of symbols from a first communication scheme (e.g. GSM) to frames of a second communication scheme (e.g. CPRI) to enable data of the symbols to be transmitted over a communication link that operates according to the second communication scheme, wherein N of the symbols are transmitted in a sequence n=0, . . . , n−1 and X of the frames are transmitted in a sequence x=o, . . . , x−1, the method including transmitting data of the symbol n during a frame x, where x is dependent upon the value $$n*T_F*f_s$$

where $T_F$ is the duration of each of the symbols from the first communication scheme and $f_s$ is the frequency of transmission of the frames of the second communication scheme.

14 Claims, 2 Drawing Sheets

DATA TRANSMISSION IN TELECOMMUNICATIONS NETWORKS

TECHNICAL FIELD

The invention relates to a method of mapping a plurality of symbols from a first communication scheme to frames of a second communication scheme to enable data of the symbols to be transmitted over a communication link that operates according to the second communication scheme. The method is particularly, but not exclusively, for use in mapping GSM symbol date to CPRI basic frames.

BACKGROUND TO THE INVENTION

The base stations of cellular telecommunications networks are conventionally located adjacent to the antenna in a casing at the base of the antenna tower. The footprint required for such a casing can make it challenging to find suitable sites for base stations. For example, if a base station is to be mounted on a rooftop, structural reinforcement may be required. Further, conventional base stations require both primary and back-up power sources.

The Common Public Radio Interface (CPRI) Specifications are available from http://www.cpri.info/spec.html (the current version of which is V4.1, which is hereby fully incorporated by reference), specifies an interface between the baseband Radio Equipment Control (REC) and Radio Equipment (RE) in a wireless base station, commonly known as a "remote radio head". CPRI allows inter-operability of equipment from different vendors. The CPRI interface is also known as "interface C".

CPRI facilitates a distributed architecture where base stations, which contain the REC, are connected to remote radio heads, containing the RE, via fibre optic links that carry the CPRI data. Such an architecture can reduce costs because only the remote radio heads containing the RE need to be situated in challenging locations, whereas the REC component can be located in a different position, where footprint, environment and availability of power may be more easily catered for.

The CPRI protocol is based on the basic 3G UMTS base station (node B) 10 ms radio frame, and has evolved from the original specification to include provisions for support of LTE, WCDMA, WiMAX-based systems, and other Standards.

As shown in FIG. 1, each 10 ms base station frame comprises 150 hyperframes, each having a length of about 66.67 microseconds. The hyperframes comprise 256 basic frames, each having a length of about 260 nanoseconds. Each basic frame comprises sixteen words of sixteen bits. The first word contains control data. The subsequent fifteen words contain user play In Phase/Quadrature-Phase (IQ) data.

The basic frame is the basic timing unit of the CPRI protocol. As mentioned above, each basic frame is about 260 nanoseconds in duration, which gives a frame rate of 3.84 Mbps/MHz. This is also the UMTS chip rate, and the period corresponds to 1 UMTS chip. The chip rate is the number of pulses per second.

The most recent versions of the CPRI Specification provides methods of mapping UMTS, LTE and WiMAX in symbol data to the basic frame rate of 3.84 MHz. However, these mapping schemes are not suitable for GSM, and, if applied to GSM, would add quite some delay to GSM transmission over the air interface, and require similar buffering at the remote radio head.

SUMMARY OF THE INVENTION

According to the present invention, there is provided a method of mapping a plurality of symbols from a first communication scheme to frames of a second communication scheme to enable data of the symbols to be transmitted over a communication link that operates according to the second communication scheme, wherein N of the symbols are transmitted in a sequence n=0, ..., n-1 and X of the frames are transmitted in a sequence x=o, ..., x-1, the method including transmitting data of the symbol n during a frame x, where x is dependent upon the value $$n*T_F*f_s$$

where $T_F$ is the duration of each of the symbols from the first communication scheme and $f_s$ is the frequency of transmission of the frames of the second communication scheme.

It is an object an embodiment of the present invention to be described below to provide an arrangement where data for a GSM symbol period can be mapped onto CPRI basic frames in a way that means that the delay in transmitting each symbol is minimised, and to ensure that the whole symbol is transmitted prior to the transmission of the subsequent symbol.

BRIEF DESCRIPTION OF THE DRAWINGS

For a better understanding of the present invention an embodiment will now be described by way of example, with reference to the accompanying drawings, in which.

DETAILED DESCRIPTION OF EMBODIMENT OF THE INVENTION

GSM Symbol Block

Figure 1:
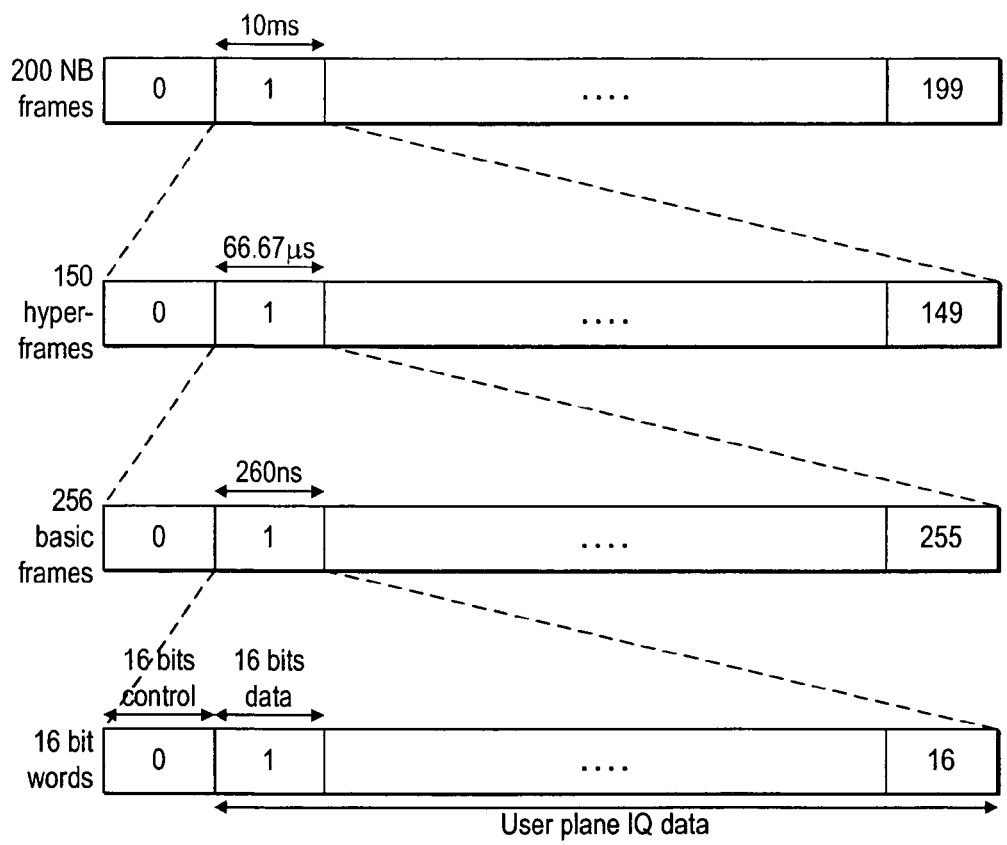
FIG. 1 shows the arrangement of frames specified in the CPRI Specification.

A first aspect of the embodiment concerns a GSM symbol block. In the embodiment, a GSM symbol block is the number, $L_{GSM\_SYM}$, of basic frames over which a GSM symbol shall be carried over the CPRI interface. A GSM symbol block is more that one basic frame in duration. A GSM symbol block carries a single GSM symbol—plus any necessary stuffing bits. The GSM symbol block can be scaled to carry the sampled data of 1 or more GSM carriers (AxCs). One GSM carrier (AxC) is the amount of digital baseband (IQ) user-plane data necessary for either reception or transmission of only one carrier at one independent antenna element.

A GSM symbol is the period of one sample of the GSM signal. The GSM signal can be sampled at different rates to give different GSM symbol sizes/rates. A GSM symbol can be defined to be any time segment over which a block of data for any system is normally carried. Hence it could also be defined as a GSM timeslot or any other relevant time period for transmitting data in any other system. The GSM normal symbol rate is approximately 270.833 ksymbols/s, which corresponds to 270.833 kbit/s for GMSK modulation (CS voice and EGPRS), 812.5 kbit/s for 8-PSK modulation (EGPRS), 1083.3 kbit/s for 16QAM modulation (EGPRS2) and 1354.2 kbit/s for 32QAM modulation (EGPRS2). The GSM higher symbol rate for QPSK, 16QAM and 32QAM modulations is 325 ksymbols/s, which corresponds to 650 kbit/s for QPSK modulation, 1300 kbit/s for 16QAM modulation and 1625 kbit/s for 32QAM modulation.

An AxC container contains the IQ samples for one AxC for the duration of one basic frame. That is, there is only one AxC container for a certain GSM carrier in a basic frame, but the basic frame may additionally include one AxC from one or more different carriers.

GSM AxC Container Block

In determining the start times of the GSM symbol block for each GSM symbol, we must first define the GSM symbols transmitted over a certain time segment to express them in terms of basic frames. We shall call this time segment (the number of basic frames over which a number of GSM symbols are transmitted) a GSM AxC container block. A GSM container block is a set of AxC containers.

GSM AxC Container Block Size

The GSM AxC container block size, K, is transmitted over time $T_k$ seconds and calculated as follows:

$$K = \frac{LCM(f_c, f_{GSM})}{f_{GSM}} \quad (1)$$

where:
K is the number of basic frames in the AxC container block.
$f_c$ is the basic frame rate of the interface C system. The interface C frame rate is 3.84 MHz
$f_{GSM}$ is GSM normal symbol rate. The GSM normal symbol rate is 270.833 ksymbols/s for GMSK, 8-PSK, 16QAM and 32QAM modulations.
LCM is the lowest common multiple.

To help understand the embodiment an example will be described with reference to FIG. 2 in which $f_c$ and $f_{GSM}$ are given low values for the sake of simplicity. These values do not correspond to the values used by interface C or GSM. However, the principles are the same.

For example, if $f_c$=160 and $f_{GSM}$=24, the LCM of $f_c,f_{GSM}$ is 480. Therefore, K=480/$f_{GSM}$=20. A container block size of 20 basic frames will accommodate a whole number GSM symbols. FIG. 2 shows a GSM symbol, GSM symbol block, basic frames and AxC carriers. FIGS. 2 also shows an AxC container block.

Start and End Times for the GSM Symbol Block Transmission

Firstly, two parameters are defined, x and n.
x is expressed as the sequence of K basic frames transmitted, 0 ... x−1 in time $T_k$ (where $T_k$ is the duration of one AxC container block).
n is expressed as the sequence of 0 ... n−1 GSM symbols transmitted in time $T_k$, where $$n=(K/f_c)/T_{GSM\_sym}$$

$T_{GSM\_sym}$ is the duration of a GSM symbol.
In the example above $f_{GSM}$=24, so $T_{GSM\text{-}sym}$=1/24=0.04166.
In the example above n=(20/160)/0.04166=3

So once we have defined that n GSM symbols corresponds to K basic frames, we define a parallel sequence for both of them (renaming K to x for the sequence). Then because a symbol takes more time than a basic frame, we need to define the starting basic frame and the end basic frame that corresponds to the start time for symbol n=0 ... n−1. So, for example, if there are 10 basic frames per symbol, when n=0, x=0, when n=1, x=10, ... and so on. I use the floor function because it is not exact matching. If we use the formula with same setup for the end time of the frame, when n=0, x=9, n=1, x=19, ... and so on.

Start time of GSM AxC symbol block
n=$T_{start\_GSM\_CPRI(n)}$
CPRI basic frame x start time, relative to GSM symbol,
n=$T_{start\_bf(x)}$ The GSM AxC symbol block, n=0 ... n−1 start time shall as aligned as possible with the start time of basic frame x=0 ... K−1, and in the equation below shall be carried in the nearest frame that starts before the actual GSM symbol start time, and shall be calculated as follows:

$$x(\text{start})=\text{floor}\lfloor n \cdot T_{GSM\_sym} \cdot f_c \rfloor, \text{ where:}$$

"floor" returns the greatest integer less than or equal to the argument.

The floor function could be exchanged by a ceiling function to instead allow the start time to be in the following frame after the GSM start time. Hence x(start)'=x(start)+1.

Similarly, the GSM AxC symbol block n shall be fully transmitted as closely as possible to the nearest GSM symbol end time, and the equation below ensures that it will be no later than than the basic frame x, where:

$$x(\text{end}) \leq \text{floor}\lfloor (n+1) \cdot T_{GSM\_sym} f_c \rfloor - 1$$

If one used the ceiling function to calculate the start time, one could also optionally use the ceiling function here to calculate the end time, i.e. x(end)'=x(end)+1.

Using the example of FIG. 2, the values of x(start) and x(end) (both using floor function) would be calculated as follows:

|  |  |  | floor |  |  | floor |
|---|---|---|---|---|---|---|
| n = 0 | x (start) = | 0 | 0 | x (end) = | 5.666667 | 5 |
| 1 |  | 6.666667 | 6 |  | 12.33333 | 12 |
| 2 |  | 13.33333 | 13 |  | 19 | 19 |
| 3 |  | 20 | 20 |  | 25.66667 | 25 |
| 4 |  | 26.66667 | 26 |  | 32.33333 | 32 |
| 5 |  | 33.33333 | 33 |  | 39 | 39 |
| 6 |  | 40 | 40 |  | 45.66667 | 45 |
| 7 |  | 46.66667 | 46 |  | 52.33333 | 52 |
| 8 |  | 53.33333 | 53 |  | 59 | 59 |
| 9 |  | 60 | 60 |  | 65.66667 | 65 |
| 10 |  | 66.66667 | 66 |  | 72.33333 | 72 |
| 11 |  | 73.33333 | 73 |  | 79 | 79 |

Hence the GSM AxC symbol block length, of $L_{GSM\_SYM}$ basic frames is constrained by the following formula:

$$L_{GSM\_SYM}=\lfloor x_{end\_bf(x,n)} - x_{start\_bf(x,n)} \rfloor +1$$

For example, for the first GSM symbol block:
$L_{GSM\_SYM}$=5−0+1=6, i.e. the first GSM symbol block has a duration of 6 basic frames.
For example, for the second GSM symbol block:
$L_{GSM\_SYM}$=12−6+1=7, i.e. the second GSM symbol block has a duration of 7 basic frames.

Mapping the Bits in the GSM Symbol Block to the Basic Frames

A GSM AxC container group is the data in a single basic frame from one or more GSM carrier (AxC) and contains data from the same GSM symbol block. The GSM AxC container group for a single basic frame carries Nc bits.

$$Nc = \text{ceil}\left[\frac{N_A \cdot N_{mod}}{L_{GSM\_SYM}}\right] \quad (2)$$

Where "ceil" is the smallest integer greater than or equal to the argument, and where $N_{mod}$ is the number of bits of sampled data in each AxC of a GSM symbol. $L_{GSM\_SYM}$ is the number of basic frames per GSM symbol. $N_A$ is the number of AxCs in each basic frame. The above equation divides the number of bits per GSM symbol by the number of basic frames per GSM symbol ($L_{GSM}$_sym), and yields the number of bits per basic frame—which is the same as the number of bits per AxC container group.

Figure 2:
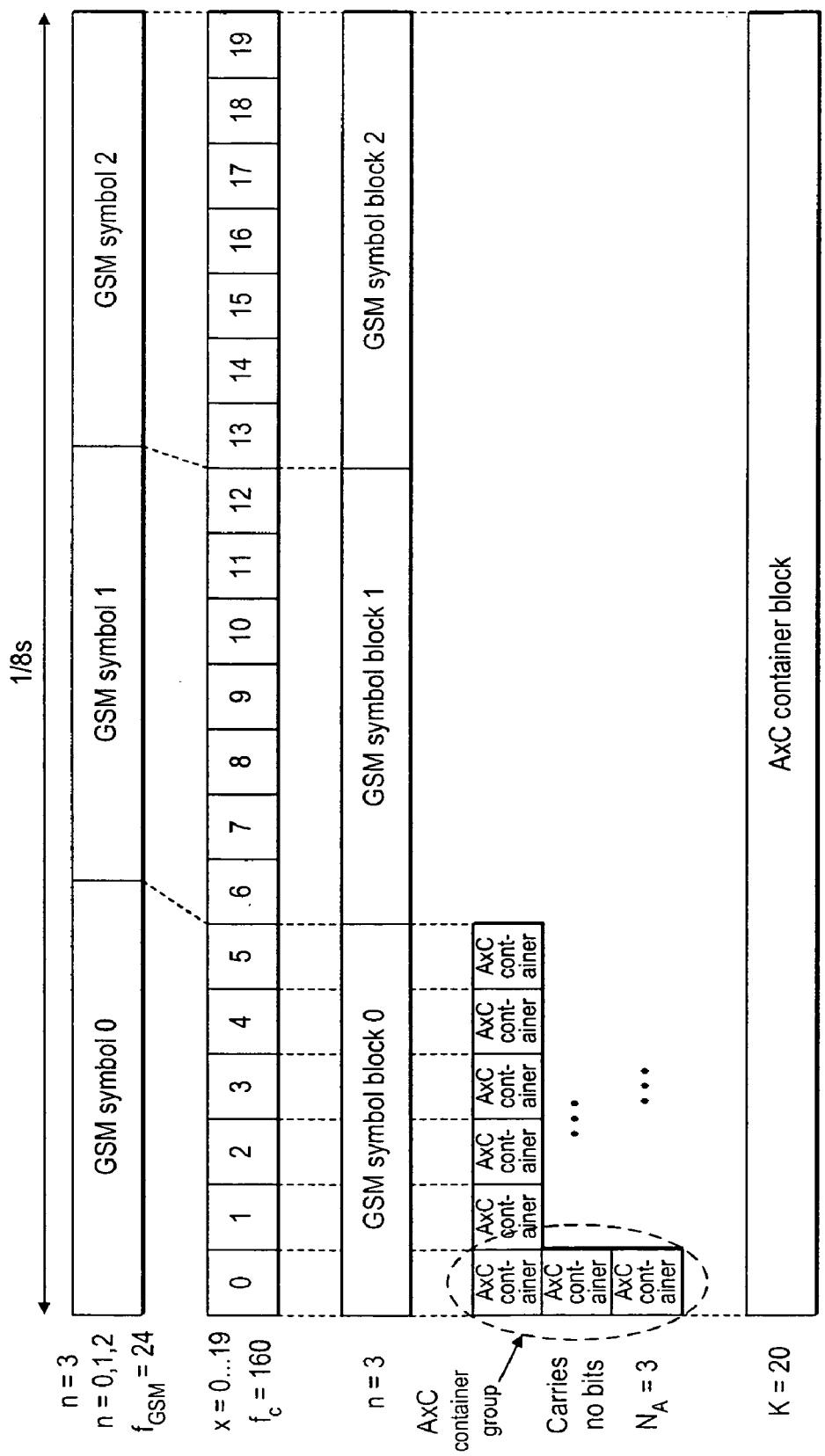
FIG. 2 shows the mapping of CPRI basic frames to GSM symbol blocks in accordance with the embodiment of the invention.

In the example of FIG. 2, for the first GSM symbol, if we assume $N_{mod}$=35, $$N_c = \text{ceil}\left[\frac{3 \cdot 35}{6}\right]$$
$$= \text{ceil}[17.5]$$
$$= 18$$

Where the GSM AxC container group is not fully filled with sample bits, stuffing bits are added. The number of stuffing bits, $N_{ST}$, in the GSM symbol block is calculated as:

$$N_{ST}=(L_{GSM\_SYM} \cdot N_c)-(N_A \cdot N_{mod}) \quad (3)$$

So if we assume that we had to round up to get Nc per basic frame, then we will end up with more spaces bits per basic frame than we need to carry sampled data. This is why stuffing bits are added.

In the example of FIG. 2, $$N_{ST}=(6*18)-(3*35)$$

$$N_{ST}=(108)-(105)=3 \text{ stuffing bits.}$$

Another Option for Nc Calculation

In this solution, the mapping of different AxCs within the container group is not defined. If we wanted to restrict the $N_{mod}$ bits of a particular AxC all to the same basic frame, then this could be achieved by modifying the above equation to:

$$Nc = N_{mod} \cdot \text{ceil}\left[\frac{N_A}{L_{GSM\_SYM}}\right]$$

However this option would not guarantee to be as bandwidth efficient, as it would not guarantee to fill up all of the $L_{SM\_SYM}$ basic frames. E.g. if there is only a single carrier, only a single basic frame of the $L_{GSM\_SYM}$ basic frames would be filled with real data, leaving the other $L_{GSM\_SYM}-1$ frames just with stuffing bits, and the C interface bandwidth requirement would likely be higher due to this.

An alternative to adding stuffing bits is to map the sample rate to the basic frame rate but this means that the sample rate would need to change as the number of transmitted AxCs (carrier transmissions) change.

Mapping AxCs to Basic Frames

The mapping of GSM AxC container groups to basic frames is dependent on the necessary characteristics, and can be done in the following ways.

Option 1: Latency-based: If latency is important, then all of the $N_{mod}$ bits for each AxC are packed into the first transmitted GSM AxC container groups, and the rest of the basic frames of the symbol block shall be filled with stuffing bits, $N_{ST}$.

Option 2: Bandwidth-efficient-based: If reducing the peak-to-average bandwidth ratio is important, then the placement of the stuffing bits is averaged (spread equally) across the GSM symbol block within p=0 to $p=N_c*L_{TSM\_SYM}$ bits. The placement in each AxC container group shall be calculated as:

$$p_i = \text{floor}\left[\frac{i \cdot N_c \cdot L_{GSM\_SYM}}{N_{ST}}\right]; \text{ for } i = 0, 1, \ldots N_{ST} - 1 \quad (4)$$

So, in our example, for the first GSM symbol:

$$p_i = \text{floor}\left[\frac{i \cdot 18 \cdot 6}{3}\right]$$

For $i = 0$:

$$p_0 = \text{floor}\left[\frac{0 \cdot 18 \cdot 6}{3}\right] = 0$$

For $i = 1$:

$$p_1 = \text{floor}\left[\frac{0 \cdot 18 \cdot 6}{3}\right] = 36$$

For $i = 2$:

$$p_2 = \text{floor}\left[\frac{2 \cdot 18 \cdot 6}{3}\right] = 72$$

So using the above equation, $N_{ST}$=3. So stuffing bit i=0 will be in bit 0 position of the GSM symbol block, stuffing bit i=1 will be in bit 36 position of the GSM symbol block and stuffing bit i=3 will be in bit 72 position of the GSM symbol block.

Option 3: Applying $2^{nd}$ method of Nc calculation: In this case, the $N_{mod}$ bits, of a particular AxC will all be placed in the same basic frame, and these basic frames could all be at the start of the GSM symbol block, or they could be spread across the symbol block, i.e. if there are 4 AxCs, and 12 basic frames, they could be placed in the first frames (0, 1, 2, 3) or spread across the basic frames (0, 3, 6, 9). The stuffing bits could then be applied in a manner that fills the remaining spaces for Nc bits in the other frames.

Offsetting the GSM Symbol Block from the Interface C Basic Frame x

It is possible to apply a frame offset between starting GSM symbol block n=0 and starting basic frame x=0.

This is can be calculated as a function of x frames, where x is between 0 and K−1.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, and/or a combination of software and hardware. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method of mapping a plurality of symbols from a first communication scheme to frames of a second communication scheme to enable data of the symbols to be transmitted over a communication link that operates according to the second communication scheme, wherein N of the symbols are transmitted in a sequence n=0, . . . , n−1 and X of the frames are transmitted in a sequence x=o, . . . , x−1, the method including transmitting data of the symbol n during a frame x, where x is dependent upon the value $$n*T_F*f_s$$

where $T_F$ is the duration of each of the symbols from the first communication scheme and $f_s$ is the frequency of transmission of the frames of the second communication scheme.

2. The method of claim 1, wherein transmission of the symbol n commences during a frame x, where x is dependent upon the value $$n*T_F*f_s.$$

3. The method of claim 1, wherein transmission of the symbol n finishes during a frame x, where x is dependent upon the value $$[(n+1)*T_F*f_s]-1.$$

4. The method of claim 1, wherein x is set to the greatest integer less than or equal to the value.

5. The method of claim 1, wherein x is set to the smallest integer greater than or equal to the value.

6. The method of claim 1, wherein N symbols are transmitted over a block of X frames, where $$x = \frac{LCM(f_s, f_F)}{f_F}$$

LCM being the lowest common multiple.

7. The method of claim 6, wherein the number of bits Nc carried by each frame is dependent upon $$\frac{N_T}{L_F}$$

where $N_T$ is the number of bits of sampled data in each of the symbols and $L_F$ is the number of frames per symbol.

8. The method of claim 7, wherein $N_C$ is the smallest integer greater than or equal to $$\frac{N_T}{L_F}.$$

9. The method of claim 8, wherein the number $N_{ST}$ of stuffing bits in each of the symbols is $$(L_F*N_C)-N_T.$$

10. The method of claim 9, including positioning the $N_{ST}$ stuffing bits at the end of the block.

11. The method of claim 9, including spreading the $N_{ST}$ stuffing bits throughout the block.

12. The method of claim 1, wherein the first communication scheme is GSM and the symbols are GSM symbols.

13. The method of claim 1, wherein the second communication scheme is CPRI and the frames are CPRI basic frames.

14. The method of claim 1, wherein the communication link is an interface between the baseband Radio Equipment Control (REC) and Radio Equipment (RE) in a wireless base station of a cellular telecommunications network.

* * * * *